Nov. 11, 1958

C. A. STEEN 2,860,225

ELECTRIC HEATING APPARATUS

Filed Oct. 23, 1956

Inventor
Carl August Steen
by Sommers & Young
Attorneys

Nov. 11, 1958 C. A. STEEN 2,860,225
ELECTRIC HEATING APPARATUS
Filed Oct. 23, 1956 2 Sheets-Sheet 2

Inventor
Carl August Steen
by Sommers & Young
Attorneys

United States Patent Office 2,860,225
Patented Nov. 11, 1958

2,860,225

ELECTRIC HEATING APPARATUS

Carl August Steen, Villa Solbacken, Getinge, Sweden

Application October 23, 1956, Serial No. 617,827

3 Claims. (Cl. 219—35)

The invention relates to an electric apparatus for heating articles of food. In electric ovens for baking and frying the resistor elements are usually entirely enclosed in the walls for heating the same as well as the air within the oven, and from the air heat is transferred to the articles of food by convection. When the walls have reached a sufficient temperature some heat is also transferred to the food by radiation.

In operation the current consumption is dependent on the time for heating the walls and the enclosed air, the time for heating the food to the desired temperature and the time for holding this temperature.

When a glowing, freely mounted helical resistance wire is used, a great portion of the rays of heat is directed towards and will be absorbed by the walls behind and at the side of the element. The bare wire under tension involves the risk of short-circuiting or accident by touch.

It is an object of the invention to provide an electric apparatus for baking or frying which is current saving and therefore economic in operation.

Another object of the invention is to shorten the time for baking and frying in electric ovens.

A further object of the invention is to improve the quality of articles of food when baked or fried in an electric oven.

A still further object of the invention is to provide an electric oven with freely mounted heating elements which eliminates the risk of short-circuiting or accidents.

Other objects and advantages of the invention will appear hereinafter, reference being made to the accompanying drawing, in which.

Figure 1:
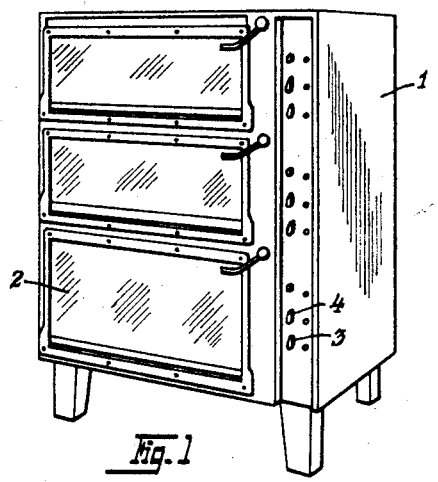
Figure 1 is a perspective view of a baking or frying oven comprising three compartments.
Figure 2:
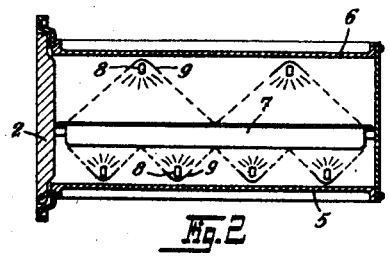
Figure 2 is a transverse vertical sectional view of a compartment according to Figure 1.
Figure 4:
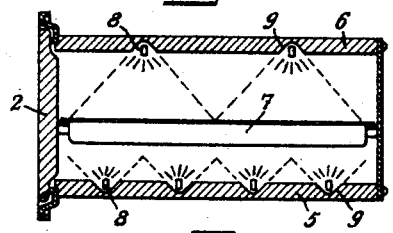
Figure 5:
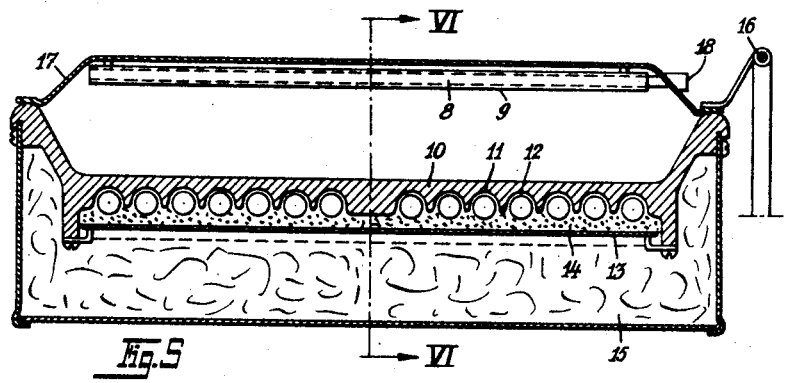
Figure 6:
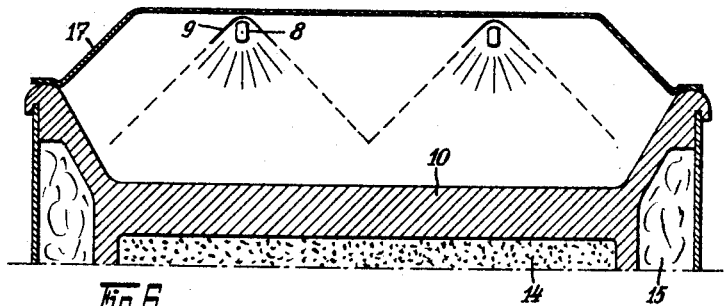

Figure 4 corresponds to Figure 2 and shows a modification;

Figure 5 is a sectional view of a frying pan;

Figure 6 is a sectional view on line VI—VI in Figure 5; and

Figure 7:
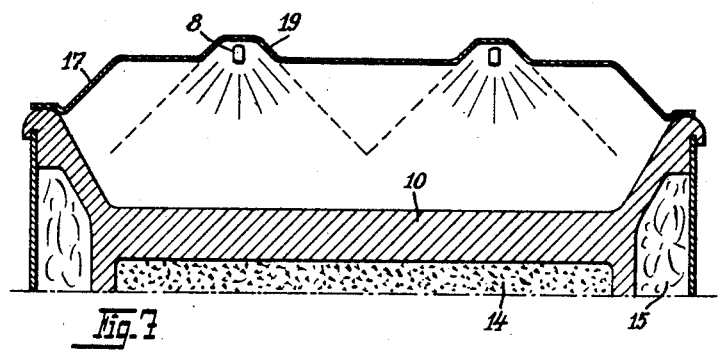

Figure 7 is a view corresponding to Figure 6 and shows a modified performance.

The baking or frying oven 1 comprises three independent compartments having each a hinged door 2, and each compartment is provided with a switch 3 for upper and a switch 4 for lower resistor elements. Between the bottom 5 and the cover 6 two plates or pans 7 are placed slidable on fixed guide rails.

Figure 3:
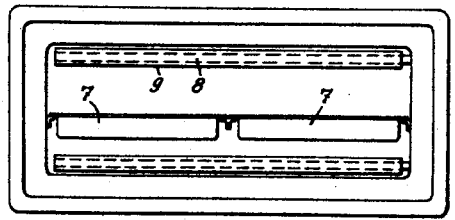
Figure 3 is a front view of the compartment with the door removed.

As shown in Figures 2 and 3 a number of heat radiating resistor elements 8 are mounted below the cover 6 and above the bottom 5 in parallel relation and evenly distributed opposite to the pans 7. Each resistor element is mounted freely and thus entirely surrounded by the air, and the elements are partly embraced by channel-shaped reflectors 9 concentrating the rays of heat evenly towards the pans. The reflectors in this embodiment are also mounted free of the cover and the bottom and may be made of any suitable metal, but aluminium is preferred as having a very high reflecting capacity.

In the embodiment shown in Figure 4 the reflectors 9 are countersunk in the cover and bottom for increasing the free space within the oven and obtaining a better protected position of the elements. The bottom and cover may with advantage be lined by a sheet metal, such as aluminium, in which channels 9 are depressed to form reflectors.

The resistor elements 8 comprise a central resistance wire spiral insulated from an outer metal tube by means of a refractory insulating material, such as steatite.

By this heating device several advantages are attained. As no elements are provided within the walls, and as the rays of heat are directed and concentrated towards the pans it is obvious that the walls are heated only slowly by contact with the air. On the other hand the temperature of the elements is raised rapidly, and as the air is heated substantially only by contact with the pans its temperature will increase slowly and stop at a value lower of that obtained in an oven with heated walls.

In spite of this it has been found that the time required for heating and holding is shorter than in ordinary electric ovens, and as also the heat losses from the walls are reduced this will mean a saving in current consumption.

The dark or ultra-red rays of heat emitted from metal surfaces have a wavelength of up to $100\mu$ or more, but in connection with the invention substantially only infra-red rays with a wavelength of 0.76 to $10\mu$ or, preferably, 0.76 to $5\mu$ are used as being of special advantage. Such rays have a higher penetration capacity than other dark rays, and they can therefore generate heat within the food and in this way shorten the heating time and prevent over-heating of the surface of the food. The heat will be more evenly distributed and the quality of the finished food has been found very high.

The temperature of the metal tube may vary between 375 and 625° C. and preferably between 450 and 575° C. In order to obtain a high heat emission per unit of surface a metal is preferred which has its surface covered by chromium oxide, and the tube is therefore preferably made of a high chromium alloy. In cross section the tube may have a substantially rectangular form with a short somewhat curved side directed towards the reflector whereby the percentage of rays reflected back to the tube is low and the emitted heat is very evenly distributed along the pans.

Figures 5 and 6 illustrate the invention applied to a big restaurant frying pan. The bottom 10 is on its lower side provided with grooves 11, in which resistance spirals 12 are placed and covered by a heat insulating material 14, such as rockwool, resting on a plate 13. The outside of the pan is covered by a further layer 15 of a similar insulating material. A cover 17 is swingably mounted at 16, and on its underside two resistor elements 8 with reflectors 9 are fastened. The ends 18 located near the pivot 16 may be provided with flexible wires connected to the electric current source.

In operation of the pan the infra-red rays have the capacity of penetrating into the articles of food which thereby are heated from above, and as the pan is heated by the elements 12 the articles are fried or baked also from below. When frying beefsteak, Swedish meat balls and the like it is not necessary to turn them, and work as well as time are saved thereby.

In the embodiment shown in Figure 7 the cover is made of aluminium, and the reflectors are obtained by pressing grooves therein.

What I claim is:

1. An electric apparatus for heating articles of food, comprising a closed casing having a hinged door at one side, a continuous supporting metal plate for said articles of food extending between two side walls of the casing so as to shield off heat radiation from above and from below, an electric heating device provided below said supporting plate at the bottom of the casing for heating said plate from below, a plurality of heating units radiating substantially only dark infra-red rays, said heating units extending freely only from one side wall of the casing to the opposite side wall thereof close below the top wall of the casing and being evenly distributed in their transverse direction opposite to the plate, said heating units being further provided with an outer, electrically insulated metal tube, and a plurality of channel-shaped metal reflectors each embracing one of said heating units so as to shield off infra-red radiation from reaching the side walls of the casing and to concentrate them evenly towards said plate.

2. An electric apparatus as claimed in claim 1, wherein the channel-shaped reflectors are counter-sunk within the upper wall of the casing.

3. An electric apparatus as claimed in claim 1, wherein the metal tubes are made of a chromium alloy and the reflectors of aluminium.

References Cited in the file of this patent

UNITED STATES PATENTS

| | | |
|---|---|---|
| 1,375,801 | Ross | Apr. 26, 1921 |
| 1,874,836 | Trenner et al. | Aug. 30, 1932 |
| 2,415,768 | Shaw | Feb. 11, 1947 |
| 2,422,950 | Cash | June 24, 1947 |
| 2,571,782 | Swenson | Oct. 16, 1951 |
| 2,627,014 | Kolb | Jan. 27, 1953 |
| 2,744,995 | Jepson | May 8, 1956 |
| 2,764,664 | Stewart | Sept. 25, 1956 |
| 2,767,297 | Benson | Oct. 16, 1956 |

FOREIGN PATENTS

| | | |
|---|---|---|
| 635,512 | Germany | Sept. 18, 1936 |